(12) United States Patent
Laffan et al.

(10) Patent No.: US 9,586,607 B2
(45) Date of Patent: Mar. 7, 2017

(54) STROLLER WITH A DUAL SPRING REAR SUSPENSION

(71) Applicant: Austlen Baby Co., Berwyn, PA (US)

(72) Inventors: Patrick William Laffan, Berwyn, PA (US); Leslie Stiba, Pflugerville, TX (US)

(73) Assignee: Austien Baby Co., Berwyn, PA (US)

( * ) Notice: Subject to any disclaimer, the term of this patent is extended or adjusted under 35 U.S.C. 154(b) by 0 days.

(21) Appl. No.: 15/040,541

(22) Filed: Feb. 10, 2016

(65) Prior Publication Data

US 2016/0229440 A1    Aug. 11, 2016

Related U.S. Application Data

(60) Provisional application No. 62/114,348, filed on Feb. 10, 2015.

(51) Int. Cl.
*B62B 9/18* (2006.01)
*B62B 7/04* (2006.01)

(52) U.S. Cl.
CPC ............... *B62B 9/185* (2013.01); *B62B 7/04* (2013.01); *B62B 9/18* (2013.01); *B62B 2206/02* (2013.01); *B62B 2301/20* (2013.01)

(58) Field of Classification Search
CPC ............... B62B 7/00–7/147; B62B 9/00–9/28
See application file for complete search history.

(56) References Cited

U.S. PATENT DOCUMENTS

| | | | | |
|---|---|---|---|---|
| 2,869,145 A | * | 1/1959 | Gregory | A47D 9/02 126/25 A |
| 3,692,323 A | * | 9/1972 | Sekine | B62B 7/08 280/124.127 |
| 4,527,665 A | * | 7/1985 | Shamie | B62B 9/18 188/200 |
| 6,663,122 B1 | * | 12/2003 | Lin | B62B 7/04 280/267 |
| 8,967,647 B1 | * | 3/2015 | Bastien | B62B 9/18 16/44 |
| 2003/0201625 A1 | * | 10/2003 | Espenshade | B62B 7/10 280/642 |
| 2003/0201626 A1 | * | 10/2003 | Hartenstine | B62B 7/083 280/642 |
| 2003/0230871 A1 | * | 12/2003 | Horacek | B62B 9/18 280/642 |
| 2006/0231312 A1 | | 10/2006 | Passeri | |
| 2006/0279070 A1 | * | 12/2006 | Hou | B60B 33/001 280/643 |

(Continued)

FOREIGN PATENT DOCUMENTS

| | | |
|---|---|---|
| DE | 8430373 | 1/1985 |
| DE | 20112112 | 10/2001 |

OTHER PUBLICATIONS

Invitation to Pay Additional Fees dated May 9, 2016, from corresponding PCT Application No. PCT/US16/17344.

*Primary Examiner* — Erez Gurari
(74) *Attorney, Agent, or Firm* — DLA Piper LLP (US)

(57) ABSTRACT

A stroller system including a rear suspension system comprising two springs is discussed. The stroller system is configured to withstand a variety of operating conditions including various terrain, speed and weight requirements. An embodiment of a stroller with a dual elastic suspension system is also discussed.

9 Claims, 10 Drawing Sheets

(56) References Cited

U.S. PATENT DOCUMENTS

| | | | |
|---|---|---|---|
| 2007/0024029 A1* | 2/2007 | Dotsey | B62B 7/086 280/642 |
| 2008/0238016 A1* | 10/2008 | Chen | B60B 33/045 280/124.145 |
| 2011/0057404 A1* | 3/2011 | Tuckey | B62B 9/18 280/47.41 |
| 2012/0242050 A1* | 9/2012 | Schroeder | B60B 5/02 280/29 |
| 2015/0076796 A1* | 3/2015 | Jane Santamaria | B62B 7/06 280/642 |

* cited by examiner

STROLLER WITH A DUAL SPRING REAR SUSPENSION

PRIORITY

This application claims priority to U.S. Provisional Application No. 62/114,348 filed on Feb. 10, 2015, the contents of which are hereby incorporated by reference.

TECHNICAL FIELD

The disclosure relates to strollers, and more particularly strollers with a rear suspension system.

BACKGROUND

Strollers have been known and used for a number of years to provide a comfortable device to move a passenger such as a baby or a small child. There is a need for a stroller to provide a smooth and comfortable ride for both the occupant and user of the stroller under a variety of conditions including different terrain characteristics, weights/loads placed on the stroller, user speeds, and the like.

SUMMARY

Disclosed is a stroller with a dual spring rear suspension mechanism. An outer spring is configured to provide a softer or cushioned feel to the passenger(s) and/or user when a user applies downward pressure on the rear handle of the stroller. An inner spring is configured to provide sufficient rigid support in order to carry heavy loads and prevent the suspension system from reaching its extreme compression limits.

A first exemplary embodiment of the stroller may have a base, a first, front, frame member, a second, rear, frame member, and a pair of laterally spaced apart wheels. The base may have a first end, a second end, and two parallel elongated portions extending therebetween. The first frame member may be connected to the base proximate the first end of the base. The second frame member may be connected to the base proximate the second end of the base. The pair of laterally spaced apart wheels may be located proximate the second end of the base. Each of the wheels may further comprise a suspension system. The suspensions system further comprises a first suspension structure fixedly attached to one of the two parallel elongated portions extending between the first and second ends of the base, a second suspension structure with a first end pivotally attached to the first suspension structure and a second end coaxially aligned with and attached to a spring suspension structure.

The spring suspension structure may also have a lower portion with a top surface, a housing structure with a first end and a second tapered end, a first spring, a second spring and a receiving element. The first spring may be contained within the housing structure and the top surface of the lower portion may be a first stop surface for the first spring and an inner housing structure contained within the housing structure may be a second stop surface for the first spring. The second spring encircles the housing structure and the first end of the second spring may be at the top surface of the lower portion and the second end may be at a base of the second tapered end of the housing structure. The receiving element of the spring suspension structure may be embedded within the one of the two parallel elongated portions configured to hold the tapered end of the housing structure. The laterally spaced apart wheels may be connected via at least one cross member. An exemplary embodiment of the stroller may further comprise a braking mechanism.

In a further exemplary embodiment, the stroller may have a dual elastic suspension apparatus comprising a first member fixedly attached to a frame of the stroller, a second member movably attached to the first member and an elastic system positioned between the second member and the frame of the stroller. The elastic system may also have a housing structure positioned between the second member and the frame of the stroller, a first elastic element contained within said housing structure, and a second elastic element surrounding said housing structure. The elastic system may be configured to dampen motion between the second member and the frame of the stroller.

BRIEF DESCRIPTION OF THE DRAWING

The invention may be understood by reference to the following description taken in conjunction with the accompanying drawings, in which, like reference numerals identify like elements, and in which.

DETAILED DESCRIPTION

Disclosed herein is a stroller with a dual spring rear suspension mechanism. An outer elastic element or spring is configured to provide a softer or cushioned feel to the passenger(s) and/or user when a user applies downward pressure on the rear handle of the stroller. An inner elastic element or spring is configured to provide sufficient rigid support in order to carry heavy loads and prevent the suspension system from reaching its extreme compression limits. The stroller may have suspension mechanisms located on either side of its body and such opposing suspension mechanisms may be mirror images of each other. As a result, references to a single suspension mechanism may be applied to all suspension mechanisms located on the stroller.

An exemplary embodiment of the stroller comprises a base, a first (front) frame member, a second (rear) frame member, and two pairs of laterally spaced apart wheels. The base may have a first end, a second end and two parallel elongated portions extending therebetween, and the base may be extendible from a first length to a second length. The first front frame member may be connected to the base proximate the first end of the base. The second rear frame member may be connected to the base proximate the second end of the base. One pair of laterally spaced apart wheels may be located proximate the second end of the base. Each of the rear wheels may further comprise a suspension system.

Figure 1:
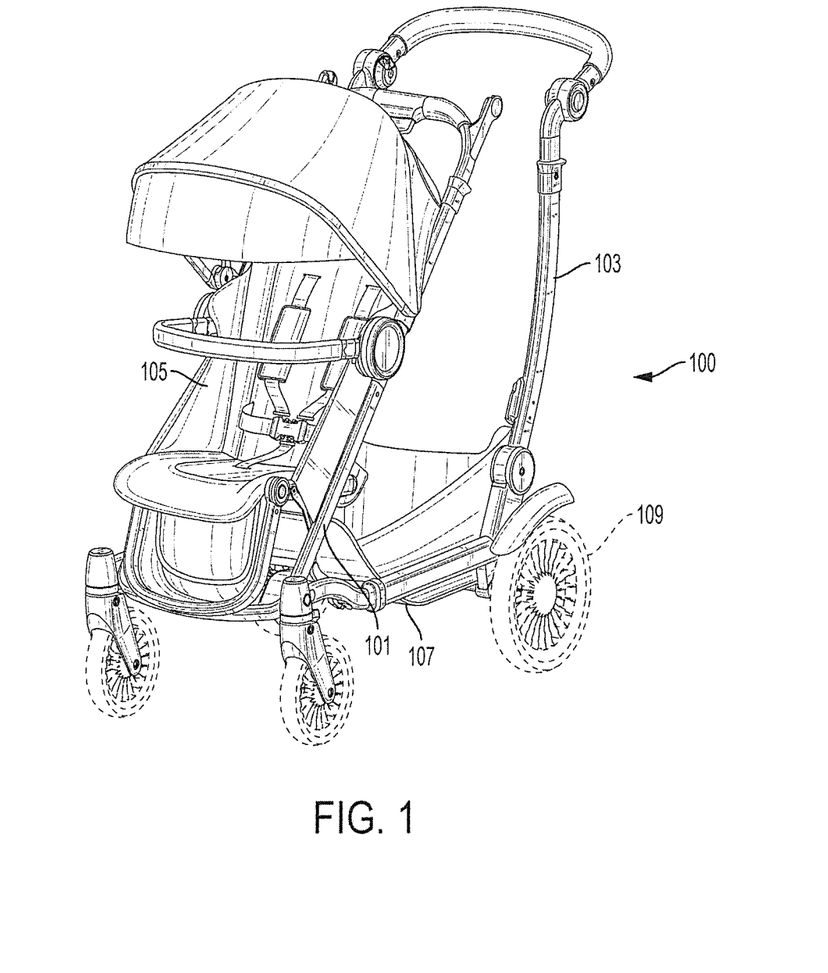
FIG. 1 illustrates a front side perspective view of a stroller system with a dual spring suspension mechanism.

A stroller system 100 with a first front frame member 101 and a second rear frame member 103 is depicted in a front perspective view in FIG. 1. The first front frame member 101 may further comprise a first seat 105. In some embodiments, the second rear frame member 103 may also contain means for accommodating a second passenger. The first front frame member 101 and the second rear frame member 103 may be connected by a base 107 comprising two parallel elongated portions which connect to the lower ends of the front frame 101 and the rear frame 103. In one embodiment the base 107 may be expandable, such that the distance between the first front frame member 101 and the second rear frame member 103 is increased when the base 107 is expanded. The stroller system 100 is substantially symmetrical with rear wheels 109 located proximate the lower ends of the second rear frame member 103.

Figure 2:
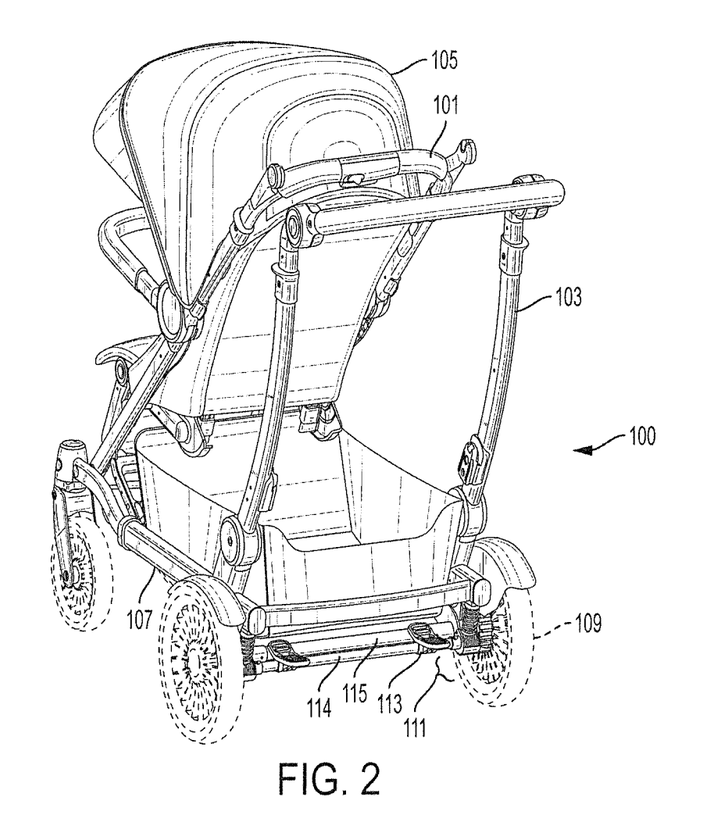
FIG. 2 illustrates a rear side perspective view of a portion of stroller system with a dual spring suspension mechanism.

A rear perspective view of the stroller system 100 is depicted in FIG. 2. As illustrated, a suspension system 111 may be located proximate the rear wheel 109, and as show, laterally between the two rear wheels 109. The suspension system 111 and rear wheel 109 assembly may be located at each of the two sides of the stroller 100. In general, the stroller system of the present invention comprises two mirror-imaged structural frames connected to each other by cross members. As the cross members may be placed in any suitable position, and since the structural frame members are mirror images, the discussion of the structure of the present invention will focus on a single frame. One skilled in the art will recognize that the description will apply equally to the mirrored frame. Each suspension system 111 and rear wheel 109 assembly may optionally be connected by a wheel axle tube 115. The stroller system 100 may further comprise one or more brake pedals 113 used in a braking system including a brake axle tube 114, adapted to simultaneously operate brakes on both rear wheels 109. Alternatively, each rear wheel may have its own brake.

Figure 3:
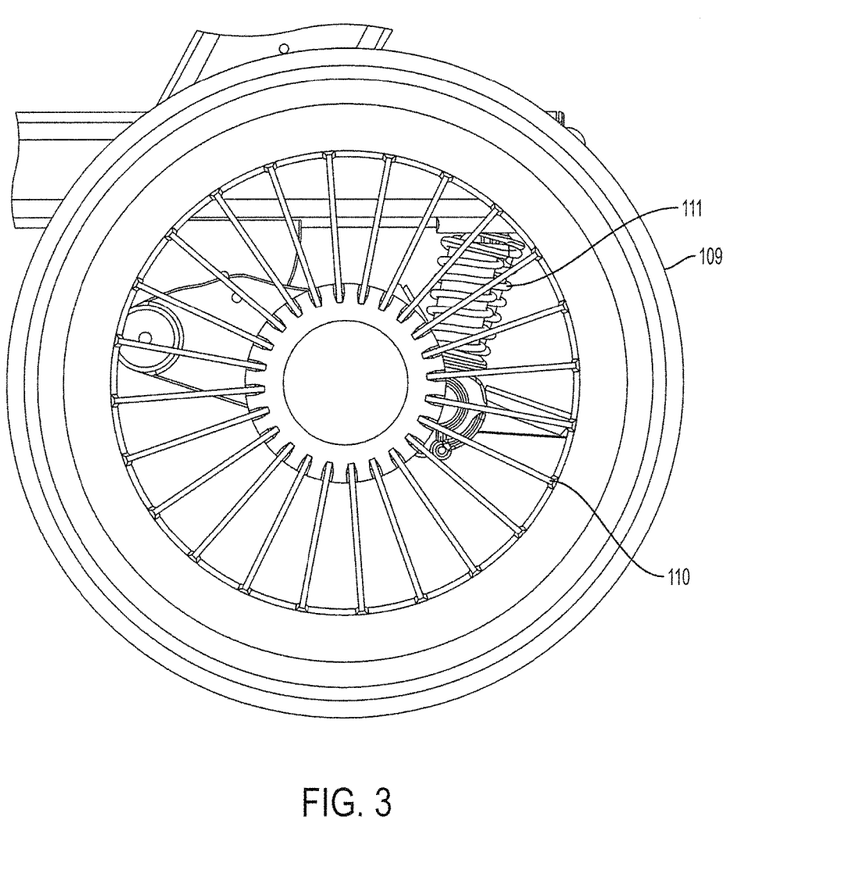
FIG. 3 illustrates a side view of a dual spring suspension mechanism for a stroller system.

FIG. 3 provides a side view of a rear wheel 109 of the stroller system. Visible through the spokes 110 of the rear wheel 109 is a portion of the suspension system 111.

Figure 4:
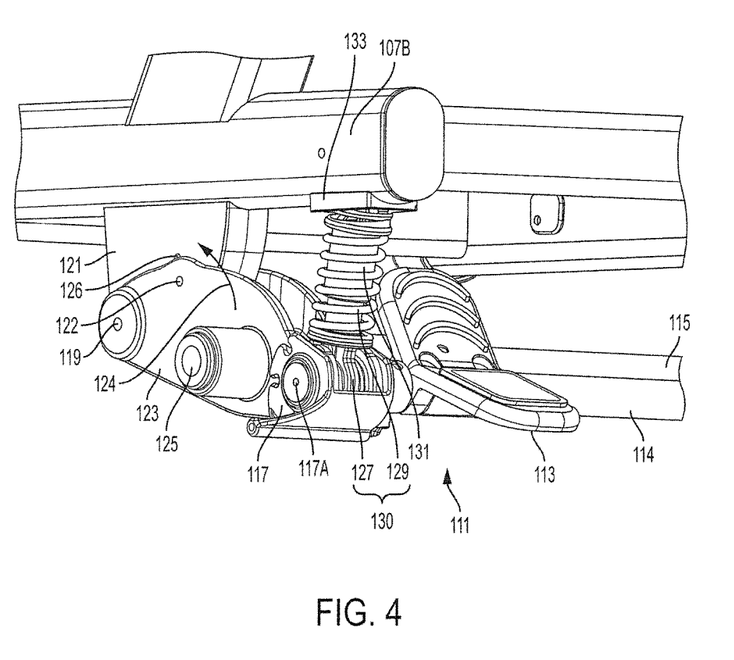
FIG. 4 illustrates a rear side perspective view of a dual spring suspension mechanism for a stroller system.

FIG. 4 provides a rear perspective view of the suspension system 111. The rear wheel 109 is not depicted in this figure. As depicted, the suspension system 111 comprises a first suspension structure 121, a second suspension structure 123 and a third suspension structure 130 comprising spring 129. The first suspension structure 121 is at least partially connected to the base 107 proximate the rear end of the base 107B, and may be of unitary construction with the base 107, welded to the base 107 or fixed to the base in some other manner. The first suspension structure 121 is pivotally connected to the second suspension structure 123 about the axis formed by pin 119. In one embodiment, the second suspension structure 123 comprises two separated plates spaced such that the first suspension structure 121 fits within the two plates of the second suspension structure 123 proximate a first end of the second suspension structure 123. The plates may be connected to each other or both of unitary construction, thus consisting of a single element. In one embodiment, the location 119 at which the first suspension structure 121 is pivotally connected to the second suspension structure 123 is fixed. Alternatively, the first suspension structure 121 and/or the second suspension structure 123 may contain grooves, tracks, paths, and the like, such that the position of the first suspension structure 121 with respect to the second suspension structure 123 may be adjusted by the user. In one embodiment, a pin inserted into a pin hole 122 engages with a slot 126 located on the first suspension structure 121 (further detail on slot 126 may be seen in FIG. 10). The first suspension structure 121 may be locked into place with respect to the second suspension structure 123 so as to prevent the first and second suspension structures from separating. At the same time, the structures may allow for the second suspension structure 123 to rotate upwards about the connection point/location 119 towards the first suspension structure 121. The direction of movement taken by 123 is illustrated by arrow 124.

The second suspension structure 123 also comprises means 125 for rotatably attaching a rear wheel 109 thereto. The second suspension structure 123 attaches to the third spring suspension structure 130 proximate a second end 117 of the second suspension structure 123. The second end 117 of the second suspension structure 123 is located at an opposing end to the first end 119 of the second suspension structure 123. The second suspension structure 123 may be configured so that the third spring suspension structure 130 fits within the opposing plates proximate the second end 117 of the second suspension structure 123. The second suspension structure 123 may be fixed to the third spring suspension structure 130 by a pin 117a or other element which coaxially aligns the second end of the second suspension structure 117 the brake axle tube 114, and at least one plate of the lower portion of the third spring suspension structure 127. The third spring suspension structure 130 further comprises an upper portion 133 proximate the rear end of the base 107B, a spring retainer or housing structure 131, an outer spring 129, and the lower portion 127, adapted to engage the second suspension structure 123, about pin 117a or some other mechanism to facilitate engagement with the second suspension structure 123. In one embodiment, the plates of the second suspension structure 123 are composed from a single injection molded piece with left and right support plates and three mount points 119, 125 and 117.

Figure 5:
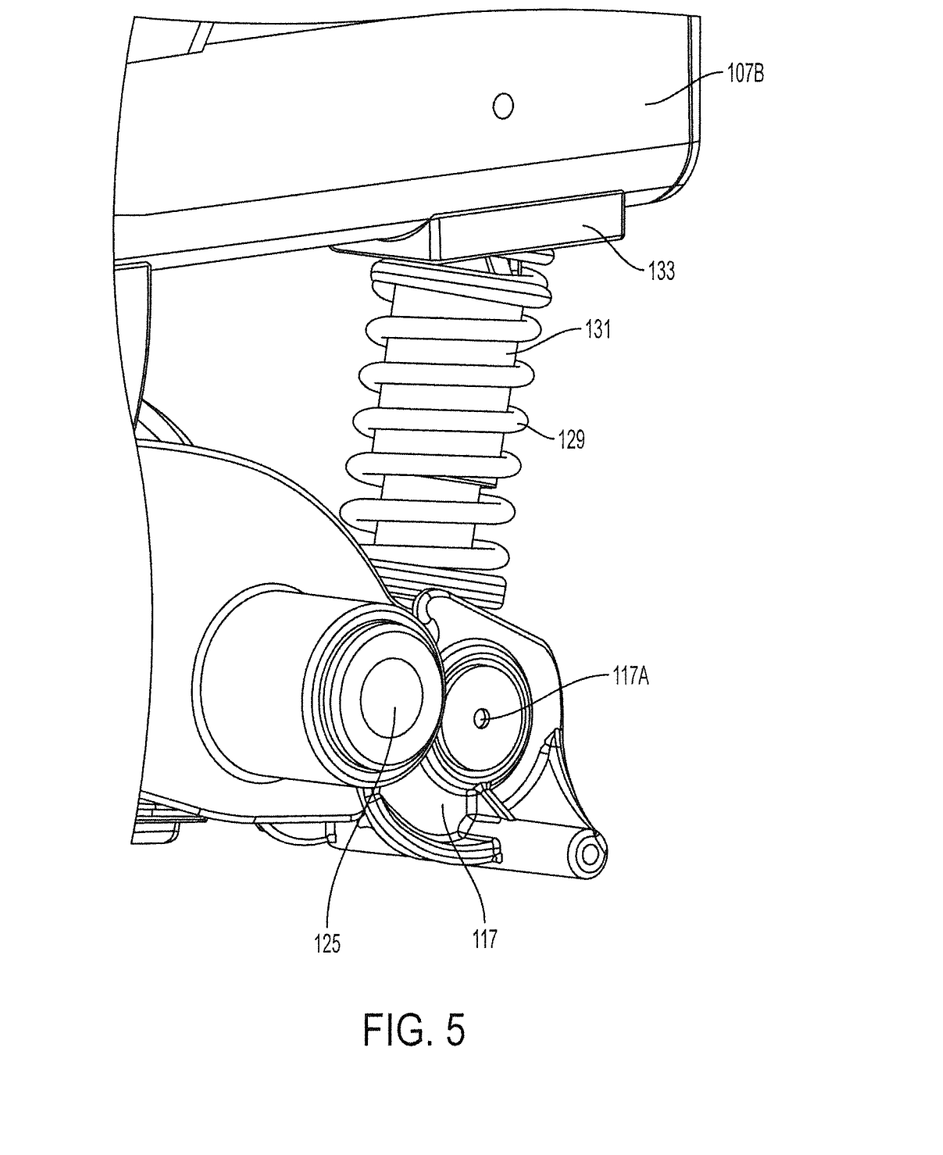
FIG. 5 illustrates a side perspective view of a dual spring suspension mechanism for a stroller system.
Figure 6:
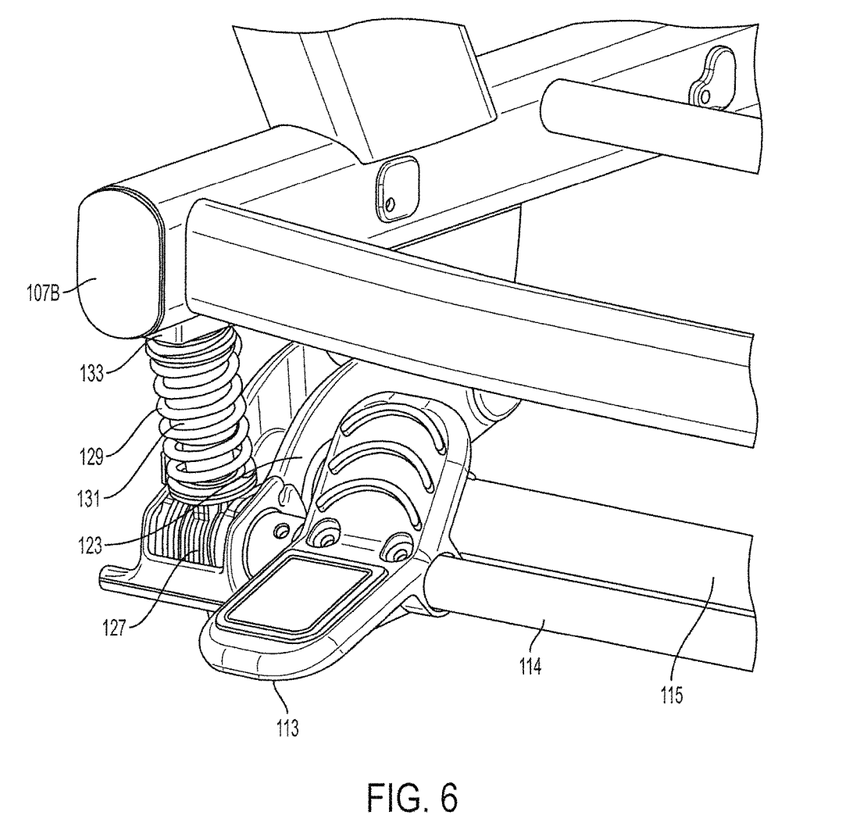
FIG. 6 illustrates a rear side perspective view of a dual spring suspension mechanism for a stroller system.
Figure 7:
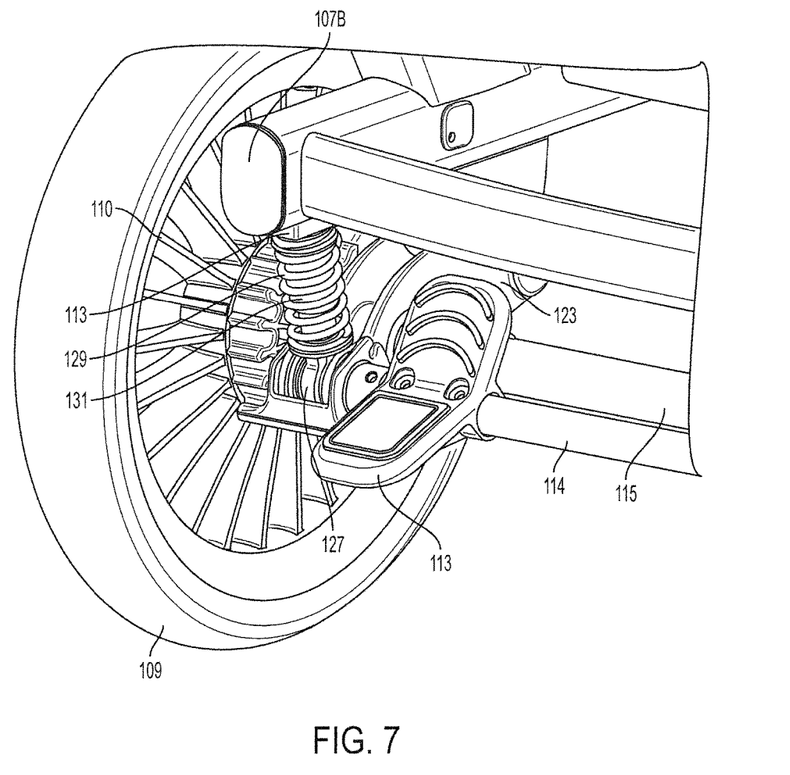
FIG. 7 illustrates a rear side perspective view of a dual spring suspension mechanism for a stroller system.
Figure 8:
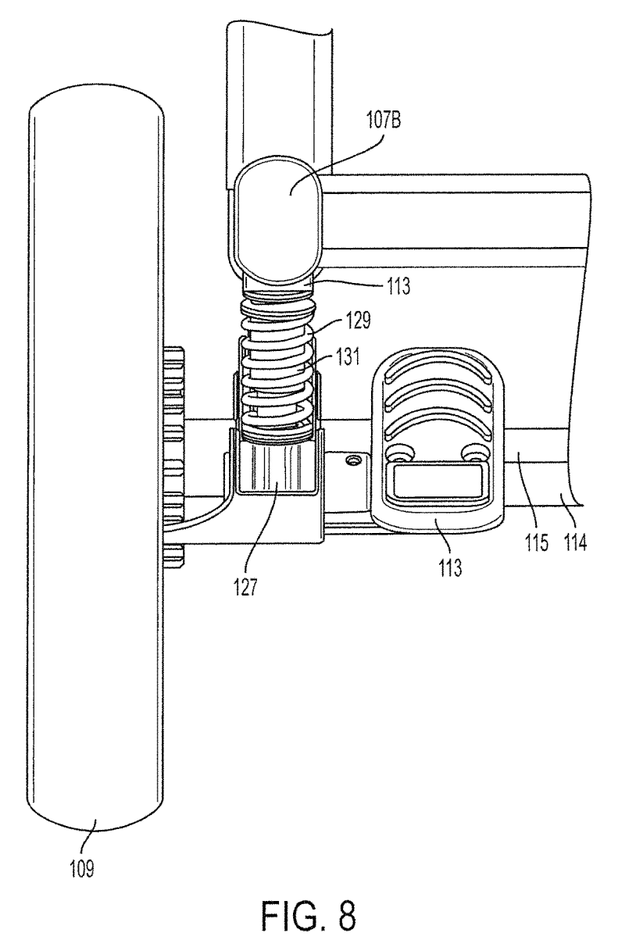
FIG. 8 illustrates a rear view of a dual spring suspension mechanism for a stroller system.

A second, side perspective view of the stroller system with the dual spring suspension mechanism is illustrated in FIG. 5. A third, rear side perspective view of the stroller system with the dual spring suspension mechanism is illustrated in FIG. 6. A fourth, side perspective view of the stroller system with the dual spring suspension mechanism is depicted in FIG. 7; in this figure, the rear wheel 109 is attached. A fifth, rear view of the stroller system with the dual spring suspension mechanism is depicted in FIG. 8; again, the rear wheel 109 is attached.

Figure 9:
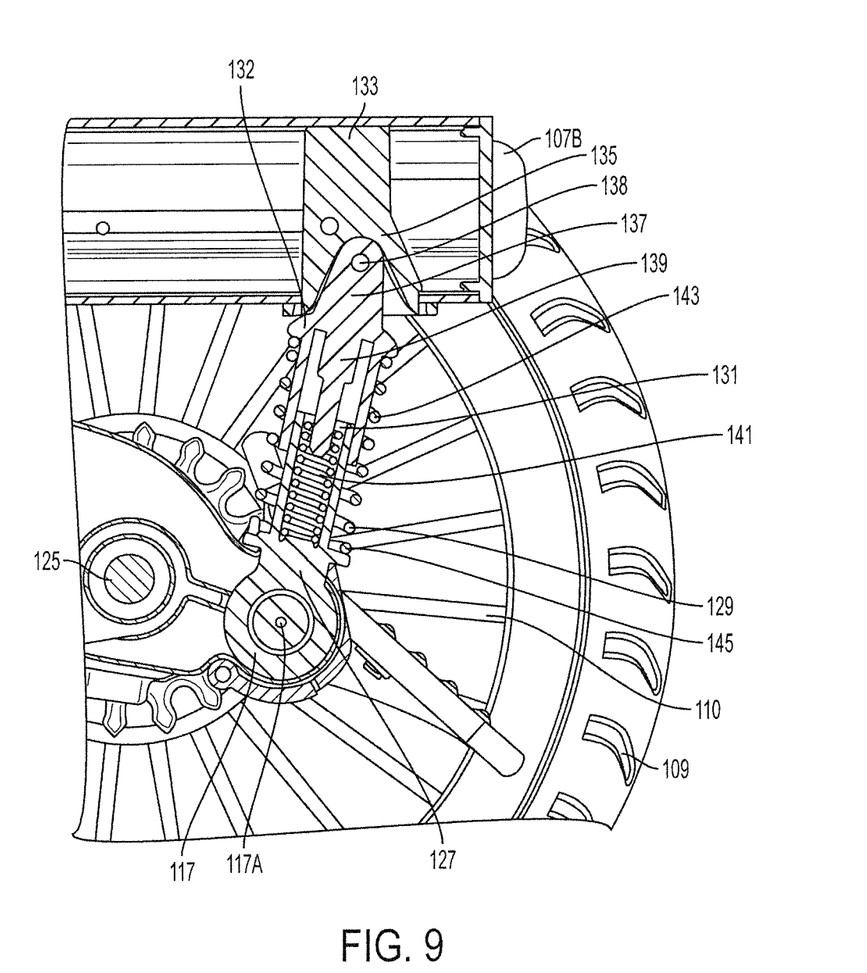
FIG. 9 illustrates a side view of a cross-section of a dual spring suspension mechanism for a stroller system.
Figure 10:
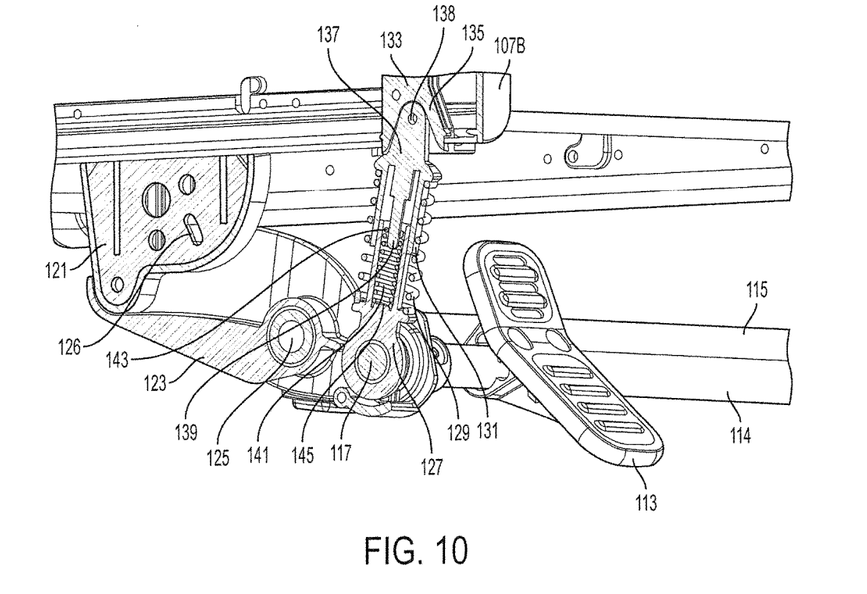
FIG. 10 illustrates a rear perspective view of a cross-section of a dual spring suspension mechanism for a stroller system.

FIG. 9 illustrates a side view of a partial cross-section of the dual spring suspension mechanism depicted from the interior of the stroller, facing outwards from an interior portion of the stroller. FIG. 10 illustrates a rear perspective view of the partial cross-section of the dual spring suspension mechanism, viewed from the outside of the stroller looking inwards. As depicted, the lower end of the outer spring 129 is coupled to a lower portion 127 of the third spring suspension structure 130. The upper end of the outer spring 129 is coupled to the upper portion 133 of the third spring suspension mechanism. The upper portion 133 of the third spring suspension mechanism may form a substantially v-shaped receiving element 135 which is adapted to engage the rear portion of the base 107B, and receives the upper portion 137 of the spring retainer or housing structure 131. In one embodiment the upper portion 137 of the spring retainer or housing structure 131 may be convex or tapered.

In one embodiment the upper portion 137 of the spring retainer or housing structure 131 may comprise a pin 138 configured to hold the upper portion 137 of the spring retainer or housing structure 131 in place with respect to the receiving element 135. The pin 138 may prevent vertical movement of the spring retainer or housing structure 131 with respect to the base 107. In one embodiment, receiving element 135 may be connected to the upper portion 137 of the spring retainer or housing structure 131 prior to attachment to the base 107, with the receiving element 135 then being connected to the base 107 using a snap fit, rivet or other connection means. The outer spring 129 surrounds a spring retainer or housing structure 131. The spring retainer or housing structure 131 has a top portion 132 of substantially larger diameter than that of the lower portion, thereby forming a lip to engage an end of the outer spring 129. Enclosed within the spring retainer or housing structure 131 is a second spring system. The second spring system comprises an inner spring 141 which encircles an inner spring retainer 139. An upper end of the inner spring 143 may be coupled to a surface formed by the sides of the inner spring retainer 139, thereby forming a lip to engage one end of the inner spring 141. The lower end of the inner spring 145 may be coupled to the interior surface of the spring retainer or housing structure 131. In one embodiment, each of the inner spring 141 and the outer spring 129 may comprise a compression spring such that the springs resists compression when the stroller rests on a supporting surface, thereby provide an upwards force. In one embodiment, the outer spring 129 may be longer than the inner spring 143, such that the outer spring is engaged in compression at all times, but the inner spring 141 only engages the inner spring retainer 139 upon compression of the spring mechanism 130 a sufficient distance to allow the spring 141 and inner spring retainer to meet. This engagement of the inner spring 141 only upon a predetermined level of compression of the outer spring 129 provides for a suspension system that allows a soft ride under normal conditions, but provides additional support and shock absorbtion in instances of extra compression of the springs 129, 141. In one embodiment, the outer spring may be compressed one inch for every 30 pounds of force, and the inner spring 141 may be compressed at the rate of one half inch for every 25 pounds of force. The compression levels of the springs may be chosen to suit desired application of the stroller and suspension system.

In alternative embodiments, a biasing and/or shock absorbing element other than or in addition to the spring may be utilized.

In an alternative embodiment, the stroller comprises a dual elastic suspension apparatus. The dual elastic suspension apparatus comprising a first member fixedly attached to a frame of the stroller, a second member movably attached to the first member and a spring system positioned between the second member and the frame of the stroller. In this embodiment the elastic system comprises a housing structure positioned between the second member and the frame of the stroller, a first elastic element contained within the housing structure and a second elastic element surrounding the housing structure. In this embodiment, the elastic system is configured to dampen motion between the second member and the frame of the stroller.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

We claim:
1. A stroller comprising:
a base having a first end, a second end, and two parallel elongated portions extending therebetween; and
a pair of laterally spaced apart wheels located proximate the second end of the base, wherein each wheel further comprises a suspension system comprising: a first suspension structure fixedly attached to one of the two parallel elongated portions;
a second suspension structure comprising a first end and a second end, wherein the second end is located at an opposing end to the first end, wherein the first end of the second suspension structure is pivotally attached to the first suspension structure;
a spring suspension member attached to the second end of the second suspension structure and one of the two parallel elongated portions, said spring suspension structure further comprising:
a lower portion with a top surface;
a housing structure with a first end and a second end;
a first spring, wherein the first spring is contained within the housing structure, wherein the top surface of the lower portion comprises a first stop surface for the first spring and an inner housing structure contained within the housing structure comprises a second stop surface for the first spring; and
a second spring with a first end and a second end, wherein the second spring is located radially outward of the housing structure, wherein the first end of the second spring is at the top surface of the lower portion and the second end is at a base of the second end of the housing structure; and
a receiving element mounted to the one of the two parallel elongated portions configured to hold the second end of the housing structure.
2. The stroller of claim 1 further comprising:
a first frame member connected to the base proximate the first end of the base; and
a second frame member connected to the base proximate the second end of the base.
3. The stroller of claim 1 wherein the laterally spaced apart wheels are connected via one or more cross members.
4. The stroller of claim 1 wherein the second spring has a length greater than that of the first spring.
5. The stroller of claim 1 further comprising a wheel braking system.
6. The stroller of claim 1 wherein the receiving element is sized to mate with the second end of the housing structure.
7. The stroller of claim 1 wherein the second end of the housing structure comprises a tapered end.
8. The stroller of claim 1 wherein the second end of the housing structure further comprises a pin.
9. The stroller of claim 8 wherein the pin prevents vertical movement of the housing structure with respect to the one of the two parallel elongated portions.

* * * * *

UNITED STATES PATENT AND TRADEMARK OFFICE
CERTIFICATE OF CORRECTION

| | | |
|---|---|---|
| PATENT NO. | : 9,586,607 B2 | |
| APPLICATION NO. | : 15/040541 | |
| DATED | : March 7, 2017 | |
| INVENTOR(S) | : Laffan et al. | |

It is certified that error appears in the above-identified patent and that said Letters Patent is hereby corrected as shown below:

On the Title Page

At (73) Assignee: Please change "Austien" to -- Austlen --.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*